US 8,542,810 B2

(12) United States Patent
Carr et al.

(10) Patent No.: US 8,542,810 B2
(45) Date of Patent: Sep. 24, 2013

(54) AUTOMATIC REJOINING OF CONFERENCES

(75) Inventors: Timothy Carr, Effretikon (CH); Oscar Ruiz Garcia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 13/052,491

(22) Filed: Mar. 21, 2011

(65) Prior Publication Data

US 2012/0243673 A1 Sep. 27, 2012

(51) Int. Cl.
*H04M 3/42* (2006.01)

(52) U.S. Cl.
USPC ....... 379/202.01; 370/261; 709/204; 709/227

(58) Field of Classification Search
USPC .................... 379/202.01; 370/261; 709/204, 709/227
See application file for complete search history.

(56) References Cited

U.S. PATENT DOCUMENTS

| 6,330,320 | B1 | 12/2001 | Cornell et al. |
| 6,853,716 | B1 * | 2/2005 | Shaffer et al. ............ 379/202.01 |
| 6,895,558 | B1 | 5/2005 | Loveland |
| 7,003,286 | B2 | 2/2006 | Brown et al. |
| 7,852,993 | B2 | 12/2010 | Ju et al. |
| 2003/0125954 | A1 | 7/2003 | Bradley et al. |
| 2004/0141605 | A1 * | 7/2004 | Chen et al. ............... 379/202.01 |
| 2005/0227680 | A1 | 10/2005 | Snowden |
| 2005/0246445 | A1 * | 11/2005 | Panasyuk et al. ............. 709/227 |
| 2007/0198656 | A1 * | 8/2007 | Mazzaferri et al. ........... 709/218 |
| 2008/0183818 | A1 * | 7/2008 | Farshchi et al. ............... 709/205 |
| 2009/0209242 | A1 * | 8/2009 | Chin ............................. 455/416 |
| 2010/0061539 | A1 | 3/2010 | Cloran et al. |

FOREIGN PATENT DOCUMENTS

WO 2010060013 A2 5/2010

OTHER PUBLICATIONS

"Push to What?", Retrieved at << http://www.andrewseybold.com/static/public/commentary/commentary162.html >>, Mar. 27, 2008, pp. 3.

* cited by examiner

*Primary Examiner* — Quynh Nguyen
(74) *Attorney, Agent, or Firm* — Turk IP Law, LLC (57) ABSTRACT

Users are enabled to re-join a conference after an intentional or unintentional disconnect based on detecting the user's identifier. An identifier associated with a user such as a caller id number is determined or a cookie installed in the user's computing device facilitating communications when the user first joins a conference. If the user's connection to the conference is severed intentionally or unintentionally, and the user attempts to connect again, the system may prompt the user whether they want to join the same conference or another conference. If the user confirms their desire to join the same conference, the system may connect them without the user having to enter conference identifier, password, or similar information.

19 Claims, 6 Drawing Sheets

AUTOMATIC REJOINING OF CONFERENCES

BACKGROUND

With the development and wide use of computing and networking technologies, personal and business communications have proliferated in quantity and quality. Multi-modal communications through fixed or portable computing devices such as desktop computers, vehicle mount computers, portable computers, smart phones, and similar devices are a common occurrence. Peer-to-peer and multiparty conferences employing multiple modalities such as Instant Messaging (IM), white-boarding, application or desktop sharing, audio and video communications are commonly used for business and personal purposes. Users can join such conferences through a wide variety of end devices ranging from simple telephones to complicated communication applications executed on computers.

Users trying to join a conference may typically call or access (e.g., via online connection) a service provider and provide a conference identifier, which may be a numeric or alphanumeric string of characters. Users may also be prompted to enter a password or similar security feature. Generally, when someone first joins a conference they may have their calendar handy and provide the conference identifier while looking at the calendar. But later after being on the call for some time, for example if they are driving and their signal drops, the call may get disconnected. When the same user wants to dial back, they may not have the conference information handy. At least having to enter long strings of conference identifiers and passwords degrade user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling users to re-join a conference after an intentional or unintentional disconnect based on detecting the user's identifier. According to some embodiments, an identifier associated with a user such as a caller id number may be determined when the user first joins a conference. According to other embodiments, a cookie may be installed in the user's computing device facilitating communications. If the user's connection to the conference is severed intentionally or unintentionally, and the user attempts to connect again, the system may prompt the user whether they want to join the same conference or another conference. If the user confirms their desire to join the same conference, the system may connect them without the user having to enter conference identifier, password, or similar information.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, users may be enabled to re-join a conference after an intentional or unintentional disconnect based on detecting the user's identifier. An identifier associated with a user such as a caller id number may be determined or a cookie may be installed in the user's computing device facilitating communications when the user first joins a conference. If the user's connection to the conference is severed and the user attempts to connect again, the system may automatically connect the user to the same conference without the user having to enter conference identifier, password, or similar information. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for facilitating multi-modal conferences. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. A "call" as used herein refers to a single or multimodal conversation with the example modalities provided throughout the disclosure. Thus, a "call" is not limited to traditional audio only communications.

Figure 1:
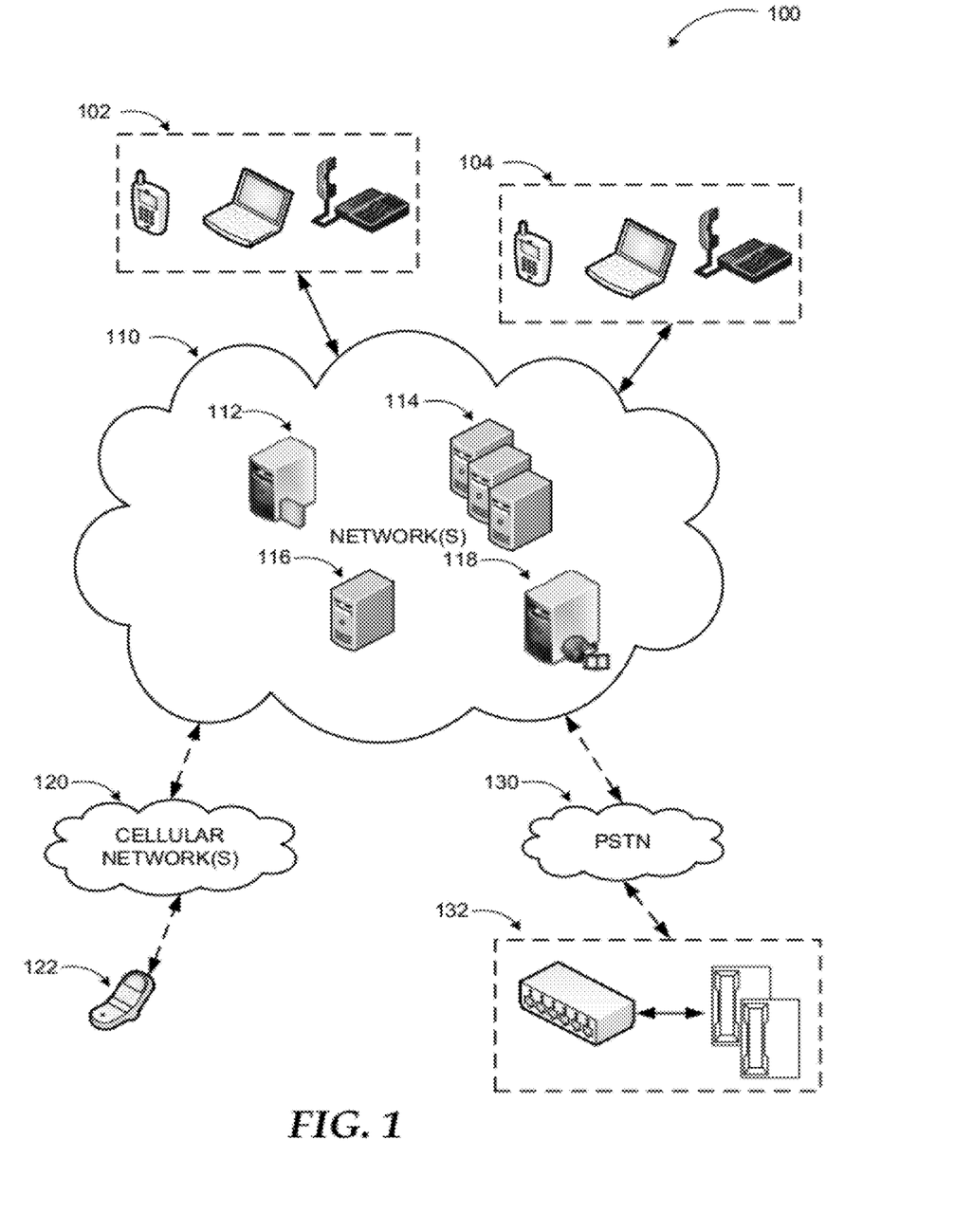
FIG. 1 is a diagram illustrating an example enhanced communications system, where embodiments may be implemented for automatic rejoining of single or multimodal conferences.

FIG. 1 is a diagram illustrating an example enhanced communications system, where embodiments may be implemented for automatic rejoining of single or multimodal conferences. Enhanced communication systems such as a unified communication system provide subscribers the ability to facilitate multi-modal communications. While such systems may integrate various aspects of multi-modal communications such as automated modality selection, subscribers may also join communications facilitated by an enhanced communication system through other types of systems such as cellular networks, Public Switched Telephone Network (PSTN), and similar ones. Thus, an enhanced communication system may provide a suitable platform for enabling users to automatically rejoin a conference facilitated across various platforms.

A unified communication system is an example of modern communication systems with a wide range of capabilities and services that can be provided to subscribers. A unified communication system is a real-time communications system facilitating instant messaging, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. End devices of other types of networks such as cellular phone 122 and telephones 132 may connect to the UC system through a cellular network 120 and PSTN 130, respectively. End devices of the UC system may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers. End devices may also include various peripherals coupled to the end devices through wired or wireless means (e.g. USB connection, Bluetooth connection, etc.) to facilitate different aspects of the communication.

UC Network(s) 110 includes a number of servers performing different tasks. For example, UC servers 114 may provide registration, presence, and routing functionalities. Routing functionality enables the system to route calls intended for a user to anyone of the client devices assigned to the user based on default and/or user set policies. For example, if the user is not available through a regular phone, the call may be forwarded to the user's cellular phone, and if that is not answering a number of voicemail options or forwarding of the incoming call to one or more designated people may be utilized. Since the end devices may be capable of handling additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, presence servers providing presence functionality, home servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

According to some embodiments, a multi-modal conference may be facilitated through an enhanced communication system such as the UC system described above. A subscriber may join the conference and their identifier (e.g., a caller id number if the subscriber is an external caller, a URI for internal subscribers, etc.) may be recorded by the server managing the conference. If the subscriber is disconnected from the conference while the conference is still occurring, they may be automatically rejoined based on the system determining that the subscriber was participating in the conference. According to other embodiments, the system may analyze additional information such as the subscriber's calendar available through their presence channel and determine that there may be another conference the subscriber may wish to join. In that scenario, the system may prompt the user with the option to join the first conference or the new conference. If the subscriber wishes to join the ongoing first conference, they may be connected without having to enter any conference identifier, password, etc. again. If the subscriber wishes to join the new conference, the prerequisite information may be requested at that time.

While the example system in FIG. 1 has been described with specific components such as mediation server, A/V server, and similar devices, embodiments are not limited to this system of the example components and configurations. An enhanced communication system facilitating automatic rejoining of conferences based on user identifier may be implemented in other systems and configurations employing fewer or additional components. Furthermore, such systems do not have to be enhanced communication systems integrating various communication modes. Embodiments may also be implemented in systems facilitating different communication modes distinctly using the principles described herein.

Figure 2:
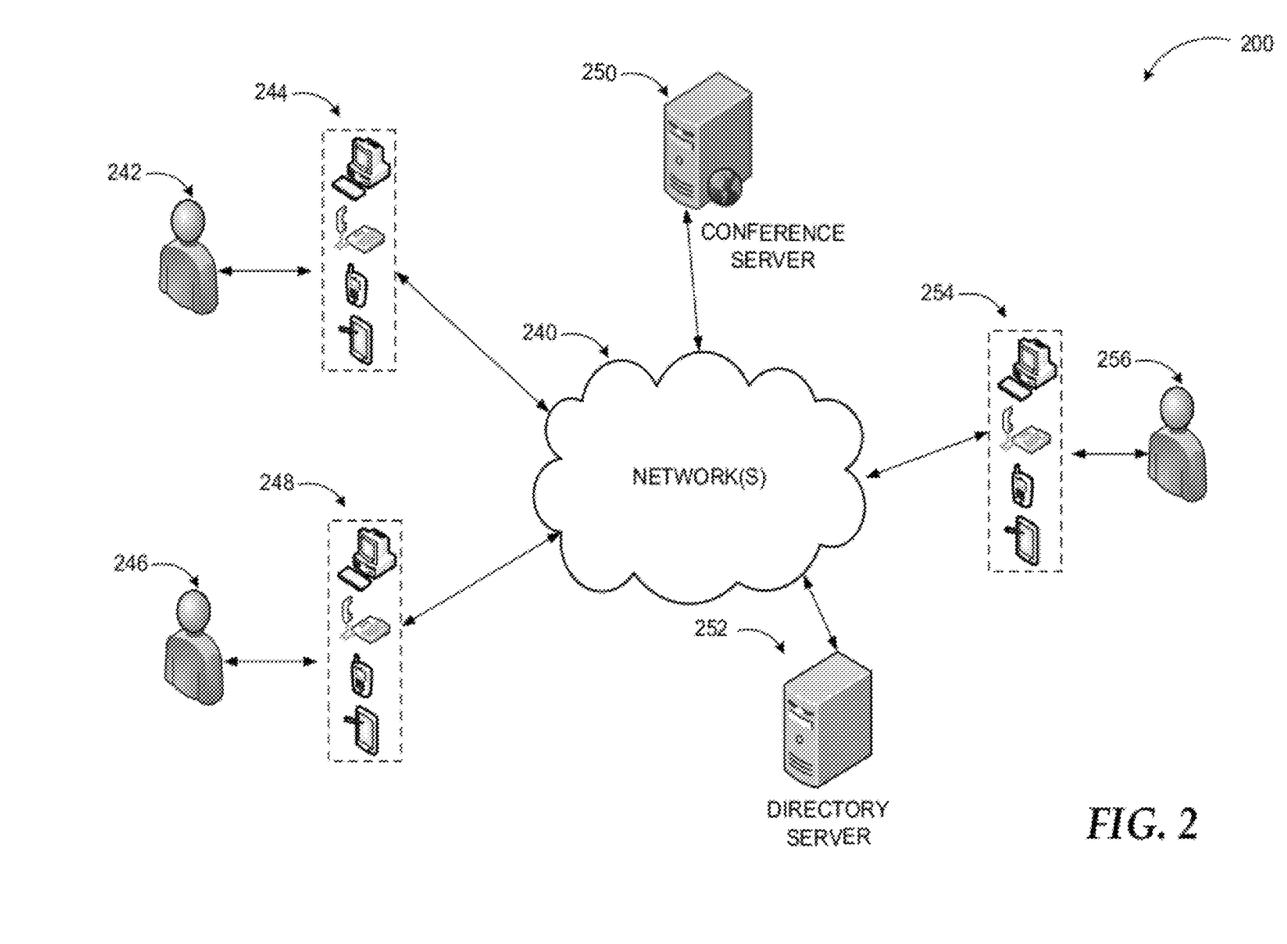
FIG. 2 conceptually illustrates an example conference session over a network.

FIG. 2 conceptually illustrates an example conference session over a network. As shown in diagram 200, a single or multi-modal conference may be managed by one or more servers such as conference server 250.

A user (e.g., any one of the users 242, 246, or 256) may send a conference invite to the other users through a variety of client (end-point) devices 244, 248, or 254, including a desktop computer, a landline phone, a cellular phone, a smart phone, and others. The conference invite may include multiple modalities. The other users may receive the conference invite through a variety of client devices as well.

Conference server 250 may determine identifiers of participating users when they are joined to the conference. According to some embodiments, a cookie may be installed on the client device of each user enabling the conference server to identify the user. Moreover, conference server 250 may receive contextual information associated with the participating users. For example, the users' calendar or location information may be received through their published presence information. In further embodiments, a directory server 252 or a similar server may collect at least a portion of the identifier and/or presence information and provide to conference server 250. The communications may be facilitated over one or more networks 240 as discussed above.

According to an example scenario, a user may join a conference providing the conference identifier and a password. At some point during the conference, the user may be disconnected. When a second call is received from the same user, conference server 250 may detect the user's identifier (or cookie) and determine that the user was participating in an ongoing conference. Conference server 250 may optionally prompt the user whether they want to rejoin the ongoing conference and connect them to the conference upon confirmation without the user having to enter the conference identifier or password again. Alternatively, the conference server 250 may automatically connect the user to the ongoing conference.

According to another example scenario, the disconnected user may call again, but this time the user's calendar may indicate that there is another conference the user is invited to. Upon determining this through the presence information, conference server 250 may provide the user to option to join the ongoing conference or the new conference and connect the user depending on their choice.

Figure 3:
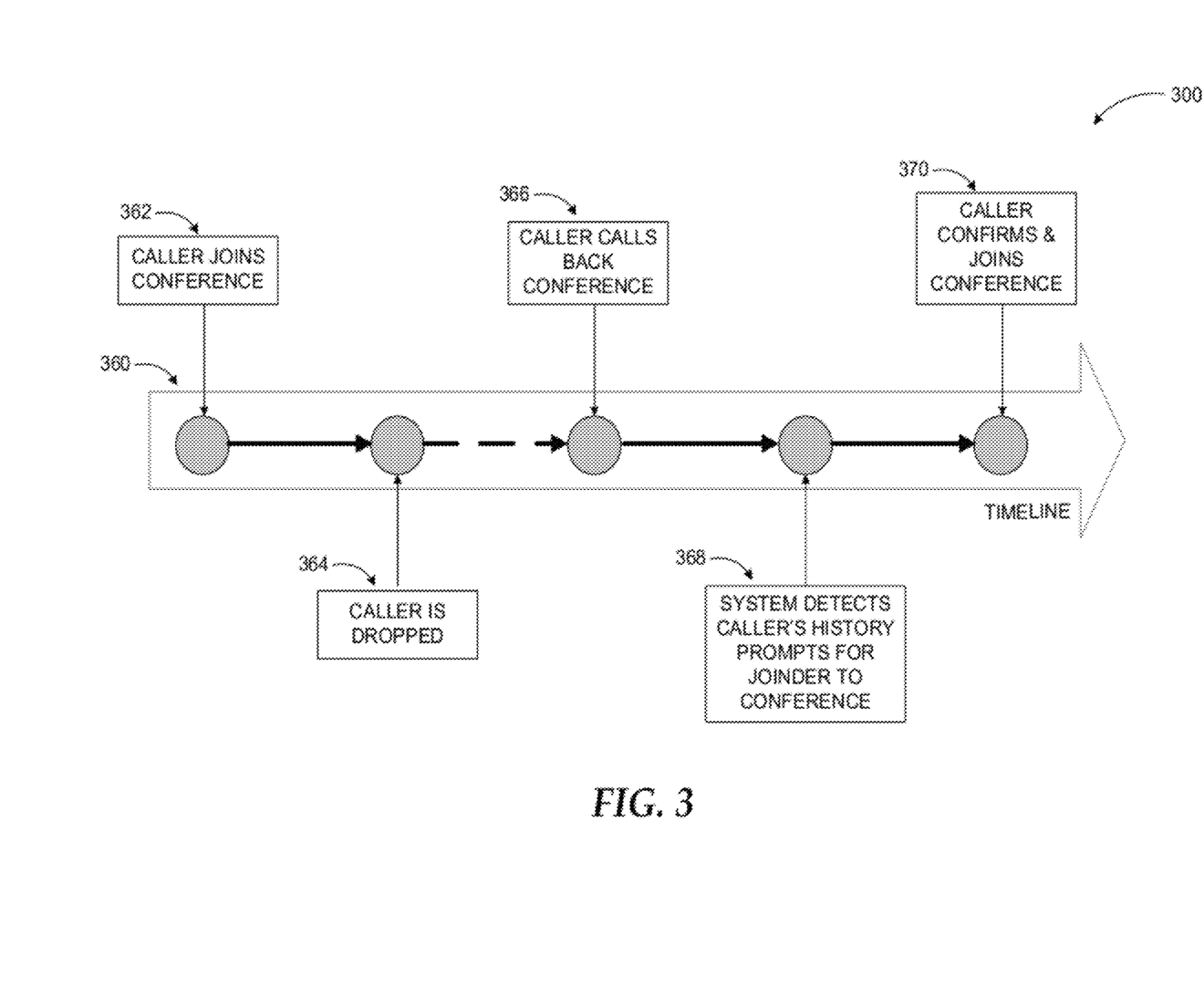
FIG. 3 illustrates example events in a system employing automatic rejoining of conferences against timeline.

FIG. 3 illustrates example events in a system employing automatic rejoining of conferences against timeline. The example events across timeline 360 in diagram 300 begin with a caller joining a conference (362). At some time point during the conference, the caller may be dropped from the conference (e.g., loss of cellular phone signal) (364). The caller may call back to the conference (366) seeking to rejoin. At that point, the system may detect that the caller was participating in an ongoing conference and is calling from the same device (e.g., phone) (368). Based on that information, the system may automatically connect the caller to the ongoing conference without requesting further conference or authentication information (370). In some embodiments, the system may analyze a time that has elapsed since the caller's last call and make a determination based on that analysis. For example, the elapsed time being less than the predefined duration of the conference may indicate to the system that the caller wants to join the same conference, or the elapsed time exceeding a predefined threshold (e.g., 5 or 10 minutes) may cause the system to conclude that caller does not wish to rejoin the same conference.

Alternatively, the system may prompt the caller to confirm that they want to rejoin the ongoing conference and connect them upon receiving the authentication information (370). In yet other examples, the system may determine that at the time of the second call, there may be at least one more conference of interest for the caller and offer the caller the choice to rejoin the original conference or another one. If the caller selects the original conference, they may be automatically connected without further information request. If the caller selects another conference, relevant information (e.g., conference identifier, authentication information, etc.) may be requested.

The different processes and systems discussed in FIG. 1 through 3 may be implemented using distinct hardware modules, software modules, or combinations of hardware and software. Furthermore, such modules may perform two or more of the processes in an integrated manner While some embodiments have been provided with specific examples for automatic conference rejoining, embodiments are not limited to those. Indeed, embodiments may be implemented in various communication systems using a variety of communication devices and applications and with additional or fewer features using the principles described herein.

Figure 4:
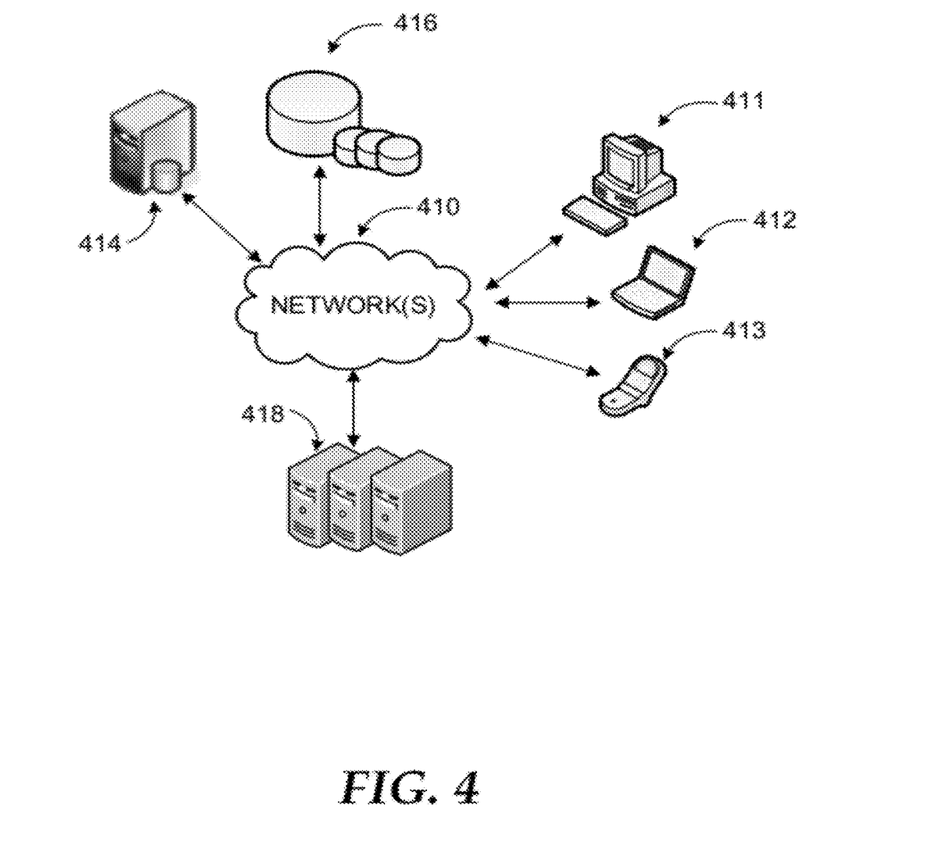
FIG. 4 is a networked environment, where a system according to embodiments may be implemented.

FIG. 4 is an example networked environment, where embodiments may be implemented. A platform for providing conference services with automatic rejoining capability may be implemented via software executed over one or more servers 418 such as a hosted service. The platform may communicate with client applications on individual devices such as a desktop computer 411, laptop computer 412, cellular phone 413, or similar devices ('client devices') through network(s) 410.

Client applications executed on any of the client devices 411-413 may interact with a hosted service providing communication services from the servers 418. The hosted service may provide multi-modal conference services and ancillary services such as presence, location, etc. As part of the multi-modal conference services, users who are disconnected from an ongoing conference may be re-connected without having to enter conference identifier, password, etc. as described above. Some or all of the processing associated with the automatic rejoining may be performed at one of more of the servers 418 or some of the processing may be performed on individual client devices. Relevant data such as user information, presence information, and similar data may be stored and/or retrieved at/from data store(s) 416 directly or through database server 414.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also include (especially between the servers and the mobile devices) cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform providing automatic conference rejoining Furthermore, the networked environments discussed in FIG. 4 are for illustration purposes only. Embodiments are not limited to the example applications, modules, or processes.

Figure 5:
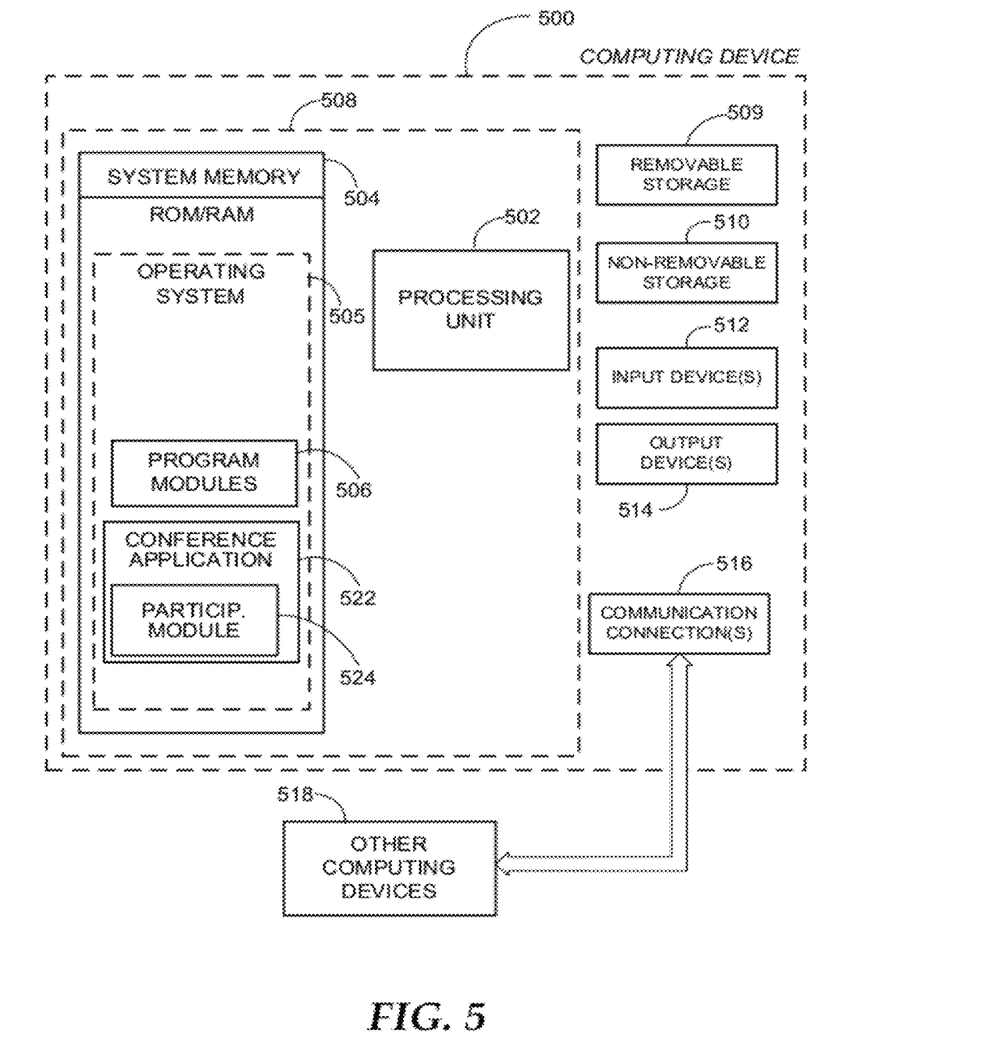
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server capable of facilitating multi-modal conferences according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. or similar ones. The system memory 504 may also include one or more software applications such as program modules 506, conference application 522, and participation module 524.

Conference application 522 may manage multi-modal conferences. Participation module 524 may receive user requested to join a conference, determine which (in case of multiple conferences) conference a particular user is supposed to join, check user identifiers and authenticate users (e.g., through a password). If users are disconnected during a conference, participation module 524 in conjunction with conference application 522 may determine a user's conference and identity, and allow them to rejoin the conference without having to enter conference identifier, password, etc. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
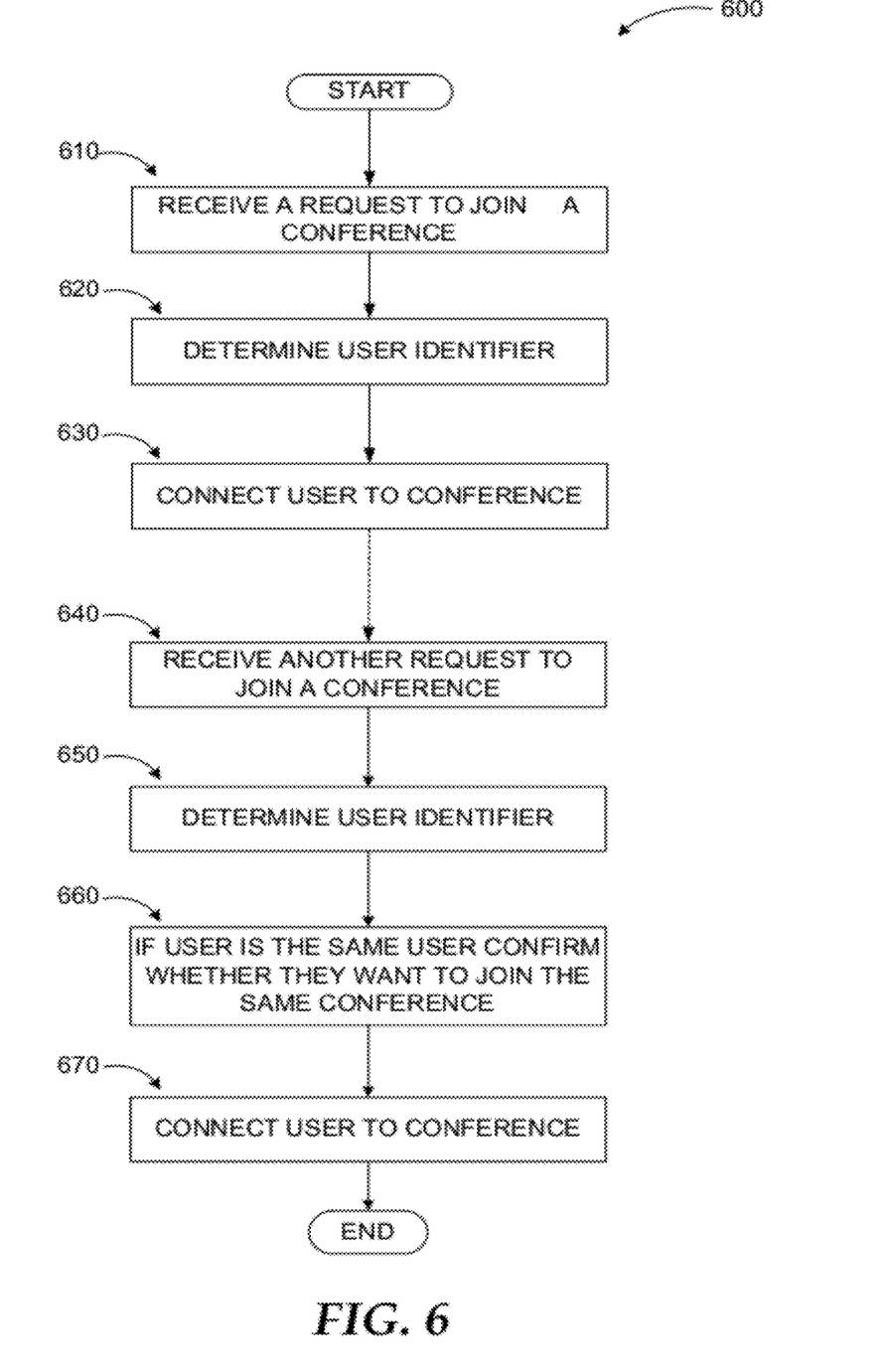
FIG. 6 is a flowchart of a process for enabling users to rejoin a conference automatically according to some embodiments.

FIG. 6 is a flowchart of process 600 for enabling users to rejoin a conference automatically according to some embodiments. Process 600 may be implemented on a conference server or similar computing device managing conferences.

Process 600 may begin with operation 610, where a request to join a conference may be received from a user. At operation 620, the server may determine an identifier associated with the user such as a caller id, a URI, or similar identifier. Alternatively, the server may install a cookie or similar file on the user's computing device for future identification of the user. At operation 630, the user may be connected to the conference. As the conference is ongoing, the user may be disconnected intentionally or unintentionally as indicated by the dashed line between operations 630 and 640.

At operation 640, a new request (e.g., a phone call to a general conferencing number) may be received for joining a conference. At operation 650, the server may determine the requesting user's identity. If the user is determined to be the same user that was in an ongoing conference based on their identifier or installed cookie, they may be prompted to confirm whether they want to join the same conference at operation 660. Upon confirmation, the user may be connected to the conference at operation 670 without having to identify the specific conference or authenticate themselves by entering a password, etc. User inputs such as conference request or confirmations may be received in natural language form and interpreted through speech recognition.

The operations included in process 600 are for illustration purposes. Automatic rejoining of conferences based on user identifier determination may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for facilitating a conference with automatic rejoin capability, the method comprising:
   receiving a request to join a conference from a user;
   identifying the user and the conference requested by the user at a conference server, wherein the conference server is configured to receive contextual information associated with the identified user including calendar and location information;
   connecting the user to the requested conference;
   while the conference is being facilitated, receiving another request from the user to join a conference;
   confirming an identity of the user, wherein the identity depends on an integrated network and includes one or more of a telephone number, a Session Initiation Protocol (SIP), or a Uniform Resource Identifier (URI);
   determining an elapsed time since the user's first request to join the conference; and
   re-connecting the user to the conference based on the elapsed time since the user's first request to join the conference.

2. The method of claim 1, further comprising:
   prompting the user to confirm that they desire to rejoin the conference; and
   re-connecting the user to the conference upon receiving a confirmation.

3. The method of claim 2, further comprising:
   prompting the user to confirm through an audio prompt; and
   evaluating a user response employing speech recognition.

4. The method of claim 1, further comprising:
   identifying the user and the conference requested by the user through prompted inputs provided by the user.

5. The method of claim 4, wherein the inputs include one of a numeric string and an alphanumeric string.

6. The method of claim 1, further comprising:
   identifying the user through detecting one of: a caller identification number and a Uniform Resource Identifier (URI) number.

7. The method of claim 1, further comprising:
   identifying the user by installing a cookie in the user's communication device.

8. The method of claim 1, further comprising:
   receiving presence information associated with the user; and
   determining availability of at least one other conference for the user prompting the user to select between the conference and the other conference.

9. The method of claim 8, wherein the presence information includes calendar data associated with the user.

10. The method of claim 1, wherein an analysis of the elapsed time includes a comparison of the elapsed time to an expected duration of the conference.

11. The method of claim 10, wherein the user is reconnected to the conference when the analysis provides the elapsed time is less than the expected duration of the conference.

12. A server capable of facilitating a conference with automatic rejoin capability, the server comprising:
   a memory; and
   a processor coupled to the memory adapted to execute a conference application that is configured to:
      receive a request to join a first conference from a user at a participation module associated with the conference application executed on a conference server, wherein the request is received in natural language form and interpreted through speech recognition;
      identify the user and the first conference requested by the user at the participation module;
      connect the user to the first conference upon authentication at the participation module;
      while the first conference is being facilitated, receive another request from the user to join a conference without having to provide a conference identifier or be authenticated again;
      confirm an identity of the user at the participation module;
      determine an elapsed time since the user's first request to join the conference, wherein the elapsed time is compared to an expected duration of the conference and an analysis is provided to the conference server for reconnecting the user to the first conference;
      receive presence information associated with the user, wherein the presence information is collected at a data server and provided to the conference server;
      upon determining availability of at least a second conference for the user, employ the conference server to prompt the user to select between the first conference and the second conference; and
      if the user selects the first conference, re-connect the user to the first conference without requesting conference identification and authentication information from the user and if the user joins the second conference request conference identification and authentication information at a time of joining the second conference.

13. The server of claim 12, wherein the conference application is further configured to connect the user to the second conference after receipt of valid authentication information from the user if the user selects the second conference.

14. The server of claim 12, wherein the conference application is further configured to prompt the user to confirm through an audio prompt to confirm whether they desire to rejoin the conference, and re-connect the user to the first conference upon receiving an audio input and determining the audio input to be a confirmation by speech recognition.

15. The server of claim 12, further comprising a display, wherein the conference application is further configured to identify the user through detecting one of: a caller identification number, a Uniform Resource Identifier (URI) number, and a cookie installed on the user's communication device.

16. The server of claim 12, wherein the first and the second conferences include at least one modality from a set of: Instant Messaging (IM), white-boarding, application sharing, data sharing, audio communication, and video communication.

17. The server of claim 12, wherein the user is connected to the conference through at least one from a set of: an enhanced communication network, a data communication network, a cellular communication network, and a Public Switched Telephone Network (PSTN).

18. A method executed at least in part in a computing device for facilitating a conference with automatic rejoin capability, the method comprising:
   receiving a call to join a conference from a caller at a participation module associated with a communication application executed on a conference server;
   identifying the caller through detecting one of: a caller identification number and a Uniform Resource Identifier (URI) number, wherein one of the caller identification number and the URI number is recorded by a server managing the conference;

identifying the conference requested by the caller, wherein the identity depends on an integrated network and the identity includes one or more of: a telephone number, a Session Initiation Protocol (SIP), or a Uniform Resource Identifier (URI);

connecting the caller to the requested conference;

detecting a disconnect of the caller participating in the requested conference;

while the conference is being facilitated, receiving another call from the caller to re-join a conference;

confirming the identity of the caller;

determining an elapsed time since the user's first request to join the conference; and reconnecting the user to the conference based on the elapsed time since the user's first request to join the conference.

19. The method of claim 18, wherein the confirmation is received from a user as audio input and evaluated employing speech recognition, and wherein at least a portion of the speech recognition is performed at a server communicatively coupled to a communication device utilized by the caller to participate in the conference.

* * * * *